UNITED STATES PATENT OFFICE.

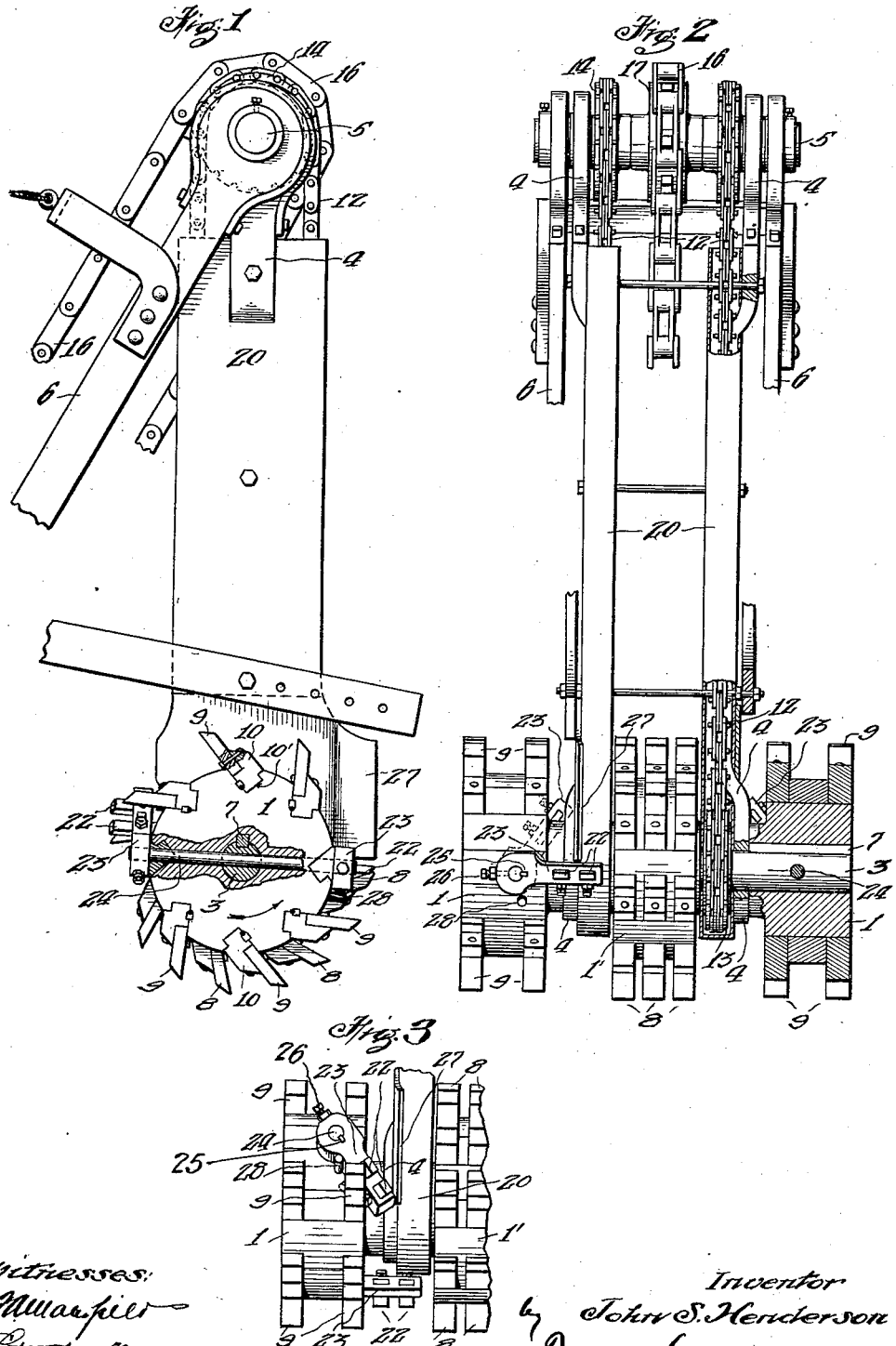

JOHN SHELDON HENDERSON, OF LOS ANGELES, CALIFORNIA, ASSIGNOR OF ONE-THIRD TO VALDEMAR SCHMIDT AND ONE-THIRD TO HELM SCHMIDT, OF LOS ANGELES, CALIFORNIA.

CUTTER FOR EXCAVATORS.

1,005,544.     Specification of Letters Patent.     Patented Oct. 10, 1911.

Application filed February 23, 1911. Serial No. 610,322.

*To all whom it may concern:*

Be it known that I, JOHN S. HENDERSON, a citizen of the United States, residing at Los Angeles, county of Los Angeles, and State of California, have invented a new and useful Cutter for Excavators, of which the following is a specification.

This invention relates to cutters for excavators such as are used in digging ditches or channels, and the main object of the invention is to provide a cutter which will cut or break up the ground the complete width of the ditch.

In excavating machines of this class, it is necessary to provide cutters comprising moving cutter members at each side wall of the ditch, and the supporting means for such cutter members necessarily extend between such movable side cutting portions of the cutter. Such a construction leaves an interval between the cutting portions for the reception of the supporting means and the present invention is directed particularly to cutter means for cutting out the ground in this space or interval.

Other objects of the invention will appear hereinafter.

The accompanying drawings illustrate the invention, and referring thereto: Figure 1 is a side elevation of the cutter with its supporting means, the cutter being partly in section. Fig. 2 is a rear elevation of the cutter with the supporting means therefor partly in section. Fig. 3 is a view similar to Fig. 2 showing the different positions of the parts.

The cutter is rotatably mounted by a shaft 3 in the lower end of supports 4 which are connected to the frame of an excavator, for example, in the manner shown in Patent No. 954,863 issued to me April 12th, 1910.

In the form of the invention shown, there are two supporting members 4, each consisting of a bar pivotally mounted on a shaft 5 at its upper end, said shaft being carried, for example, by beams 6 supported by an excavator frame, and the cutter means comprise two cylindrical bodies 1, mounted respectively at the outer sides of the respective supports 4, and an intermediate cylindrical cutter body 1' mounted between the two supports 4, each of said supports 1 and 1' being rigidly secured to the shaft 3, for example, by means of a key 7. The intermediate cutter body 1' is provided with cutting teeth 8 and the bodies 1 of the side cutters are provided with cutting teeth 9, said cutting teeth each being, for example, secured to blocks 10, which are keyed or otherwise secured in corresponding recesses 10' formed in the bodies 1. The shaft 3 is operated by any suitable means, for example, by chains 12 running over wheels 13 and 14 on the respective shafts 3 and 5, said shaft 5 being driven by a chain 16 running over wheel 17 on said shaft. Said chain 16 is connected to be driven in any suitable manner, it being understood that the supporting and driving connections for the cutter are preferably such as to enable it to be raised or lowered or moved forward or back according to the requirements of the work in hand. A casing 20 may be provided for each of the chains 12.

In addition to the cutter teeth 9 fixed on the respective side cutters, movable teeth 22 are provided, said teeth being mounted on or secured to arms 23 mounted to turn on the respective bodies 1 on axes transverse to the axis of shaft 3 by means of shafts 24 which extend diametrically through said bodies and through the said shaft 3, said arm 23 being secured to said shaft by key 25 and set screw 26. Each of the supports 4 is provided with a projection or plate 27 adapted to engage with each of the arms 23 in the rotation of the side cutter as hereinafter set forth. A pin 28 is provided on each side cutter body 1 to engage the corresponding arm 23 to prevent the arm from being thrown too far by the operation of the plate 27. The arms 23 on each shaft 24 extend at an angle to each other so that when the rear arm swings up, the forward arm is extended to horizontal position, projecting across the interval between the cutters 1 and 1', occupied by the supports 4.

The operation is as follows: The shaft 3 being set in rotation by the driving means above described, the cutter bodies are rotated and the teeth 8 and 9 thereof cut away the ground along the lines of travel of said teeth. In the rotation of the side cutters each arm 23 is brought up beneath the plate or member 27 as shown in Fig. 2 and in the further rotation of the side cutter the said arm wipes over said cam plate thereby turning from the position shown in Fig. 2 to the position shown in Fig. 3, and in this operation the arm 23 at the other end of the transverse shaft 24 is turned from position shown in Fig. 2 to position shown in Fig. 3 thereby bringing said other arm to horizontal position and causing its cutters to extend in front of the support 4, so that in the further rotation of the side cutters the said cutter teeth will scrape and cut the ground directly in front of said support 4 and clear the way for the advance of said support. In this operative movement of the cutters, the arm 23 at the forward end of the transverse shaft 24 is held in projecting or operative position by the continued engagement of the other arm 23 with the plate 27 which extends continuously alongside of the support 4 throughout an angular range sufficient to hold the forward descending cutter arm projected until it passes working or cutting position and until it rises directly beneath the cam plate to position shown in Fig. 2. At or directly preceding this moment, the arm 23 which has been in contact with the plate 27 slips or passes off said plate at the front end thereof, so that it is free to be depressed into horizontal projecting position as above described by the operation of the other arm 23 which is at this time at the rear and coming into operative relation with the plate 27.

What I claim is:

1. A cutter for excavators comprising a shaft, teeth connected to said shaft to rotate therewith, and movable cutter teeth mounted to rotate with the shaft and to turn relatively to the shaft on an axis transverse to the axis of the shaft, and means for holding said movable cutter teeth in operative position in a portion of the rotation of said shaft.

2. In combination with a support, a shaft journaled therein, cutter teeth connected to said shaft to rotate therewith and movable cutter members mounted to rotate with the shaft and to turn on an axis transverse to the axis of the shaft, and means on said support to engage said movable cutter members to hold said cutter members in operative position during a portion of rotation of said shaft.

3. In combination with a support, a shaft journaled therein, a body member fixed to said shaft, teeth carried by said body member, a movable cutter member comprising a shaft journaled in said body transversely of the aforesaid shaft, and arms on said transverse shaft extending at an angle to each other, cutter teeth carried by each of said arms and a plate on said support and engaging said arms alternately in the rotation of the shaft to move and hold the other of said arms in operative position.

4. In combination with two supports, a shaft journaled therein, a side cutter body member secured to said shaft on the outside of said supports, an intermediate body member secured to said shaft between said supports, cutter teeth secured to the respective body members and rotating therewith, a transverse shaft journaled in each of said side body members and extending transversely to the first named arms on said transversely extending shafts, cutter teeth carried by said arms and plates engaging each of said arms during a portion of the rotation of said shaft to hold the other of said arms in operative position for cutting during such portion of the rotation.

In testimony whereof, I have hereunto set my hand at Los Angeles, California, this 15th day of February, 1911.

JOHN SHELDON HENDERSON.

In presence of—
ARTHUR P. KNIGHT,
FRANK L. A. GRAHAM.

Copies of this patent may be obtained for five cents each, by addressing the "Commissioner of Patents, Washington, D. C."